United States Patent [19]

Alden et al.

[11] 4,358,778

[45] Nov. 9, 1982

[54] ADJUSTABLE BLADE FOR FACSIMILE RECORDING MACHINE

[75] Inventors: John M. Alden, Needham; George C. Williams, South Easton, both of Mass.

[73] Assignee: Alden Research Foundation, Brockton, Mass.

[21] Appl. No.: 351,115

[22] Filed: Feb. 22, 1982

Related U.S. Application Data

[63] Continuation of Ser. No. 133,484, Mar. 21, 1980, abandoned.

[51] Int. Cl.³ .............................................. G01D 15/06
[52] U.S. Cl. ................................ 346/101; 346/139 C; 346/165
[58] Field of Search ............... 346/101, 139 C, 139 A, 346/165

[56] References Cited

U.S. PATENT DOCUMENTS

| | | | |
|---|---|---|---|
| 2,380,467 | 7/1945 | Ressler | 346/139 C |
| 2,621,999 | 12/1952 | Alden | 346/101 X |
| 2,743,990 | 5/1956 | Leonard | 346/101 |
| 2,758,906 | 8/1956 | Alden | 346/101 X |
| 2,872,276 | 2/1959 | Eaves | 346/101 |
| 3,569,985 | 3/1971 | Somida | 346/139 |
| 3,701,997 | 10/1972 | Simpkins | 346/139 C X |
| 3,787,889 | 1/1974 | Shaler | 346/139 A |
| 4,114,165 | 9/1978 | Bludnikas | 346/139 C |

*Primary Examiner*—Joseph W. Hartary
*Attorney, Agent, or Firm*—James H. Grover

[57] ABSTRACT

The facsimile recording machine having a loop electrode which moves along its own locus, a portion of which includes a linear track. The linear track is opposed by a scanning electrode, between which, a printout is produced on a web. The linear track in which the loop electrode moves is transversely adjustable towards and away from the scanning electrode and also includes a lubricious member therein which holds the electrode moving therepast, in a linear path, free of vagaries and against one side of the linear track.

18 Claims, 17 Drawing Figures

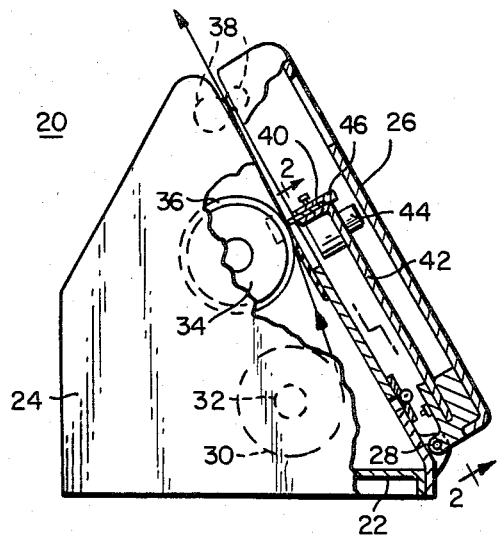
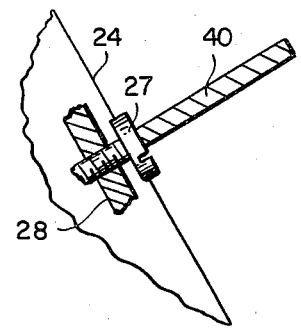
FIG.1 FIG.1A
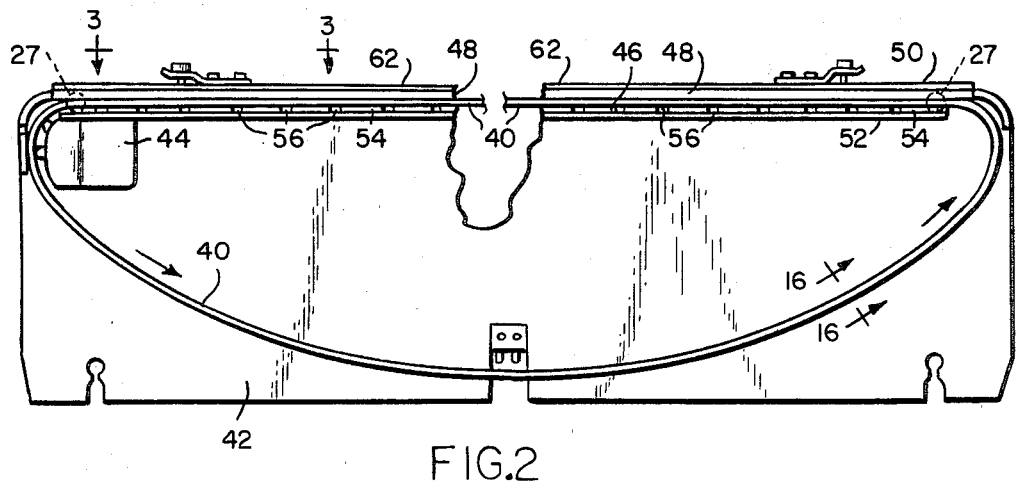
FIG.2
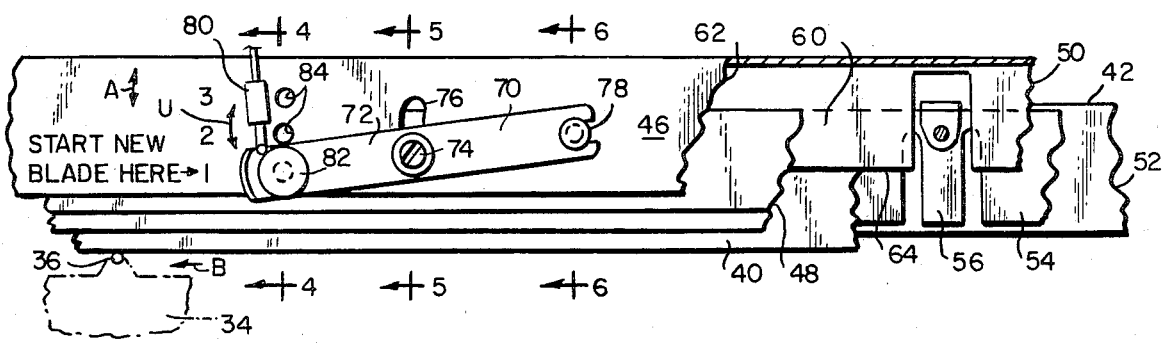
FIG.3

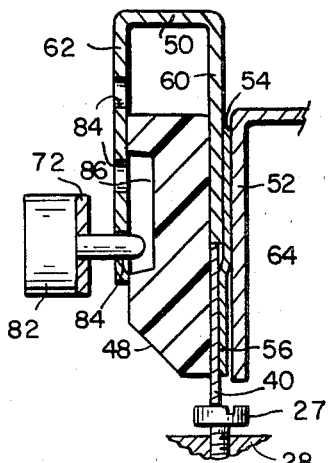
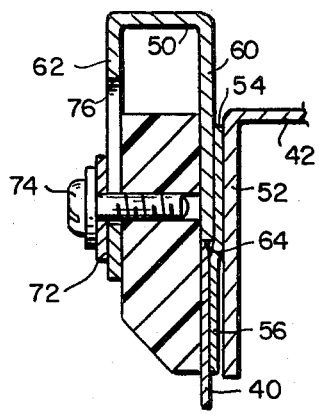
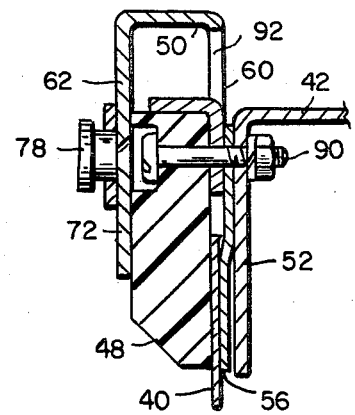
FIG.4     FIG.5     FIG.6
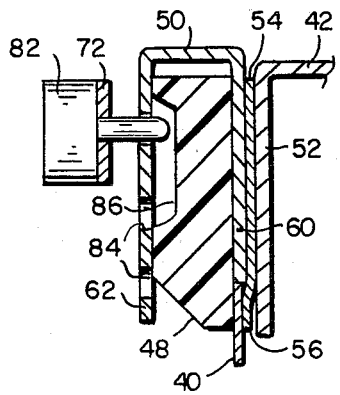
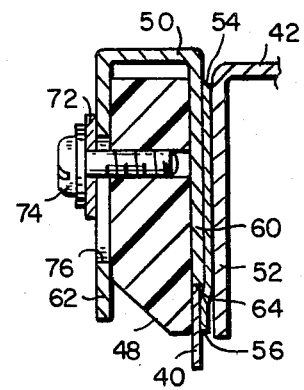
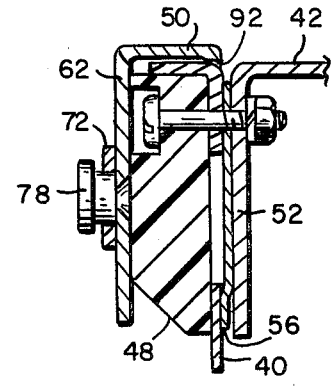
FIG.8     FIG.9     FIG.10
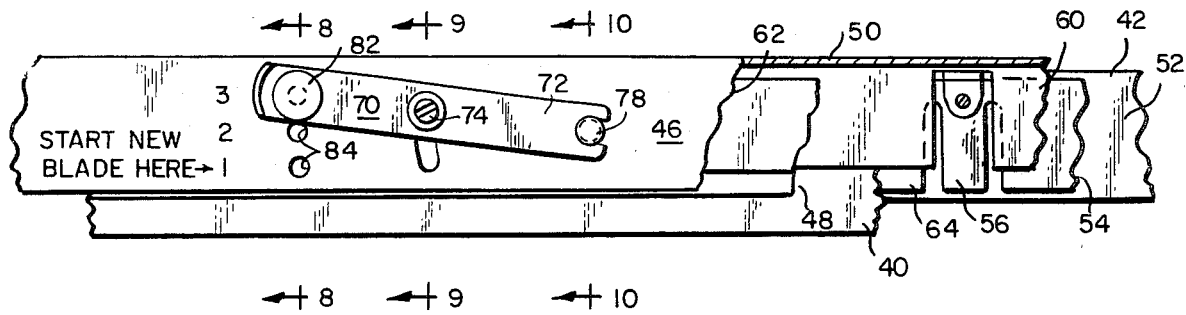
FIG.7

ADJUSTABLE BLADE FOR FACSIMILE RECORDING MACHINE

This is a continuation, of application Ser. No. 133,484 filed Mar. 21, 1980, now abandoned.

BACKGROUND OF THE INVENTION (1) Field of the Invention

This invention relates generally to facsimile recording machines, and more particularly, to loop electrode arrangements on facsimile recording machines.

(2) Prior Art

Facsimile recorders are machines which receive electrical signals as input and transcribe them as visual indicia onto a moving web of paper arranged between a pair of moving electrodes. One of the electrodes is a helical band which is arranged about a revolving drum. The other electrode is an endless belt or loop which is caused to travel both a straight path and a curvilinear path along its locus of motion. The web of paper is moist and electrosensitive as it slowly passes between the electrodes, in coordination with the rotation of the helical drum electrode and the loop electrode. The locus of contact of the helical and loop electrodes sweeps along the drum while an electric current passes between the electrodes marking the paper with ions transmitted thereon from the loop electrode, thus producing the facsimile message. This ion transmission is important to the recording operation but also is the cause of gradual erosion of the marking blade, that is, the loop electrode.

To produce the messages in the most economical fashion, the loop electrodes must be adjustable toward the travelling web of paper to compensate for erosion of the electrode, instead of otherwise having to replace them frequently. An attempt to compensate for loop electrode erosion is shown in U.S. Pat. No. 2,743,990 to Leonard, wherein a plurality of arms with headed pins at their distal ends are held against the non-eroding edge of the loop by a spring arrangement. This method is not only complicated and difficult to properly maintain, it permits undesirable movement of the loop electrode such as flexing and reduces clarity of the transcribed message.

An object of the present invention is to provide a facsimile printing machine with a loop electrode which is adjustably arranged to be movable towards and away from the plane of the paper to compensate for erosion of that electrode.

Another object of the present invention is to provide a facsimile printing machine with a loop electrode having a linear portion which is actually maintained in a linear condition during interaction with its propinquitous portion of the helical electrode.

Yet another object of the present invention is to provide a facsimile printing machine with loop electrode supporting means which minimizes friction and heat buildup therewithin.

Yet still another object of the present invention is to provide a facsimile printing machine having loop electrode adjusting means with means to indicate the amount of loop electrode erosion therewith.

BRIEF SUMMARY OF THE INVENTION

The present invention comprises a facsimile recordng machine having a loop electrode a portion of which forms a recording zone and is slidably arranged in a linear track, the linear track fully supporting the loop electrode against any curvature thereof, while permitting transverse adjustment thereto, as erosion occurs. The linear track includes an elongated lubricious mwember fixedly arranged to a frame portion of the machine, and a channel-shaped member movably disposed over the lubricious member. The loop electrode is arranged to move adjacent the frame and be in sliding contact with the lubricious member and an edge of the channel-shaped member. As erosion occurs, a linkage arrangement is caused to move the channel into closer registry with the lubricious member, thus causing the channel edge in contact with the loop electrode to move transversely towards the plane of the paper. The channel-shaped member also has cut-out portions to expose coded portions of the lubricious member, indicating the extent of loop electrode adjustment. The movement between the channel-shaped member and the elongated lubricious member, as well as the frame, may also be accomplished by a camming lever arrangement.

BRIEF DESCRIPTION OF THE DRAWINGS

The objects and advantages of the present invention will become more apparent when viewed in conjunction with the following drawings, in which:

FIG. 1 is a side view of a facsimile recording machine with sections cut away to show portions of the mechanism therein;

FIG. 1A is an enlarged detail of FIG. 1;

FIG. 2 is a view taken along the line 2—2 of FIG. 1;

FIG. 3 is a view taken along the line 3—3 of FIG. 2;

FIG. 4 is a view taken along the line 4—4 of FIG. 3;

FIG. 5 is a view taken along the line 5—5 of FIG. 3;

FIG. 6 is a view taken along the line 6—6 of FIG. 3;

FIG. 7 is a view similar to FIG. 3, with the adjustment means thereof in a different position;

FIG. 8 is a view taken along the line 8—8 of FIG. 7;

FIG. 9 is a view taken along the line 9—9 of FIG. 7;

FIG. 10 is a view taken along the line 10—10 of FIG. 7;

DESCRIPTION OF THE PREFERRED EMBODIMENT

Figure 11:
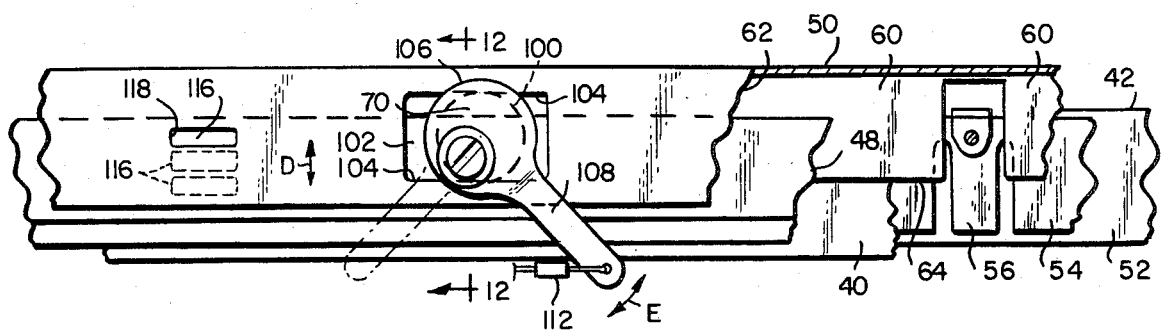
FIG. 11 is a view similar to FIG. 3, showing an alternative adjusting means.

Referring now to the drawings in detail, and particularly to FIG. 1, there is shown a facsimile recording machine 20, in a side view, comprising a base or frame portion 22, a housing 24, and a cover 26 connected thereto by a hinge 28. A roll of moist electrosensitive paper 30 is journalled about a spool 32 supportively disposed within the housing 24. A rotatable drum 34 is also journalled within the housing 24, the drum 34 housing a flexible, scanning helical electrode 36 disposed therearound, which is in electrical contact with the proper circuitry of the facsimile recording machine 20. A pair of drive rollers 38 are rotatively disposed above the rotatable drum 34, one each in the housing 24 and the cover 26.

A loop or band electrode 40, shown in FIGS. 1 and 2, is disposed within a frame 42 secured in the cover 26, the frame 42 having a loop electrode drive motor 44 arranged therethrough, and an adjustable linear track support 46 therealongside. The linear track support 46 holds the straight portion of the loop electrode 40 against the web of electrosensitive paper 30 as it is pulled therepast. The loop electrode 40 is caused to move through its circuitous path by the drive motor 44 which is coordinated with the speed of the drive rollers 38 and the rotatable drum 34. The drive rollers 38 pull the web or paper 30 between the loop and helical electrodes 40 and 36 and through the nip they generate between one another.

The band electrode 40 carried on the hinged cover 26 swings with the cover until the ends of its straight portion engage stop screws 27 (FIGS. 1A, 2 and 4). Each stop screw 27 is adjustable in a flange 28 on the housing 26 so as to position the straight electrode portion in a predetermined position relative to the helical electrode 36 for correct pressure of the band electrode against the flexible helical electrode.

The loop electrode 40 is held in a linear configuration for that portion of its path which is comprised of the linear track support 46, the linear track support 46 including an elongated lubricious member 48 movably arranged within a U-shaped channel 50, as shown in FIGS. 3, 4 and 5. The frame 42 has a flange 52 to which the adjustable linear track support 46 is attached. A bearing strip 54 is secured to the flange 52 and comprises a portion of the linear track support 46. The flange 52 has a plurality of concave fingers 56 disposed therealong, which are bowed outwardly along their centers to provide a smooth yet firm bearing surface against which the loop electrode 40 may slide. The U-shaped channel member 50 has an inner wall 60 and an outer wall 62, the inner wall having a support edge 64. The lubricious member 48, as mentioned above, is disposed within the U-shaped channel 50 and is fixedly attached to the flange 52 at a plurality of points therealong. The U-shaped channel 50 may be moved in a direction "A" transverse to the direction of motion of the loop electrode 40, which is indicated by the letter "B", in FIG. 3.

Movement of the U-shaped channel 50 may be effected by a movement mechanism 70 which in the first embodiment comprises an arm 72 which pivots about a fixed pin 74. The pin 74 extends through an arcuate slot 76 in the outer wall 62 of the channel 50, and into the stationary lubricious member 48. One end of the arm 72 is movably attached to a pivot pin 78, which pivot pin 78 is secured to the outer wall 62 of the channel 50. The other end of the arm 72 is moved back and forth in the direction indicated by the arrow "C", shown in FIG. 3, by a biasing means 80 which may be a pressurized cylinder, a spring device a portion of which may be secured to the frame 42, or the arm 72 may even be moved manually. The end of the arm 72 to which the biasing means 80 is adapted, has an indicating knob 82 disposed therein, shown in FIGS. 3 and 4. A plurality of holes 84 or detents are arranged in the outer wall 62 of the channel 50 to indicate successive locations of movement of the swingable end of the arm 72. The lubricious member 48 has a cut-out portion 86 which eliminates any interference it may have with the knob 82.

FIGS. 4, 5 and 6 show the relative position of the loop electrode 40 with respect to the location of the indicating knob 82 at the end of the biased arm 72. FIG. 4 shows the knob 82 in indicating hole 84 marked number 1 in FIG. 3. The walls 60 an 62 of the channels only partially envelope and mate with the lubricious member 48, because the loop electrode 40 in this Figure is of full width and has not yet begun to erode. The support edge 64 of the inner wall 60 which is in sliding engagement with the non-eroding edge of the loop electrode 40, is positioned only approximately halfway down the side of the flange 52 of the frame member 42. FIG. 5 shows the fixed pin 74 near the lower end of the arcuate slot 76, and FIG. 6 shows the pivot pin 78 secured to the outer wall 62, as well as a securing means 90 which fastens the lubricious member 48 to the flange 52, through an opening 92 in the inner wall 60 of the channel 50, which opening 92 permits the lubricious member 48 to remain fixedly secure with respect to the frame 42, while permitting the channel 50 to slide therearound, upon proper activation of the movement mechanism 70.

The swingable arm 72 as shown in FIG. 7, is situated with the knob 82 in the last indicating hole 84, designated here as a number 3. In this position, support edge 64 of the inner wall 60 of the channel 50 is caused to push the non-eroding edge of the loop electrode 40 to a position further alongside the flange 52, to compensate for the material lost or eroded from the loop electrode 40 as the facsimile machine 20 has been used. The elongated lubricious member 48 is more fully enclosed by the walls 60 and 62 of the channel 50, as shown in FIGS. 8, 9 and 10. That is, the eroded edge of the loop electrode 40 is approximately the same distance from the distal edge of the flange 52 of the frame 42 as it was when the loop electrode 40 was new and not eroded and the channel 50 in a preadjusted position.

Figures 12, 13:
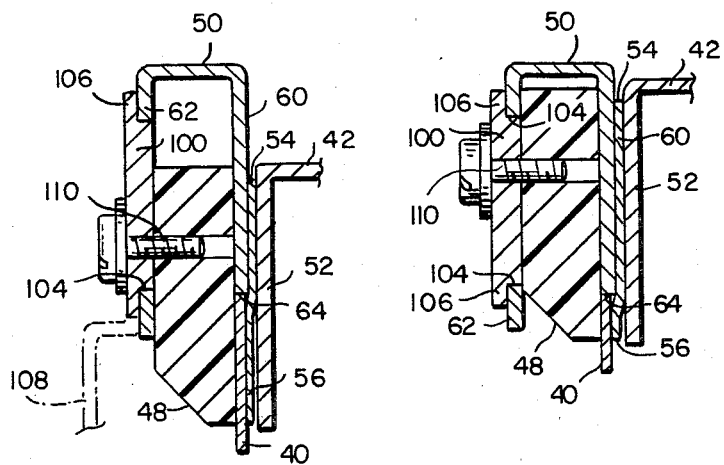
FIG. 12 is a view taken along the line 12—12 of FIG. 11.
FIG. 13 is a view similar to FIG. 12 of the adjusting arrangement shown in phantom in FIG. 11.

A second embodiment of the movement mechanism 70 is shown in FIG. 11, where the transverse movement of the channel 50, indicated by the letter "D" is effected by an eccentrically rotating disc 100 in a closely mating cam relationship with a port 102 having a plurality of edges 104 disposed in the outer wall 62 of the U-shaped channel 50. The rotating disc 100 has a lip 106 which is connected to a lever arm 108. The disc 100 may rotate about an axis 110 arranged eccentrically with respect to the disc 100 and fixed with respect to the lubricious member 48 into which it is embedded. The lever arm 108 may be caused to swing arcuately in the direction of the arrow labeled "E" as shown in FIG. 11, by a means 112 such as a spring biasing means, a pneumatic biasing means, or by manual manipulation, all adapted to actuate the movement mechanism 70 by proper means as erosion of the loop electrode 40 occurs. The positions of the lever arm 108 as shown in solid lines in FIG. 11 shows the initial positions with respect to the channel 50 and with respect to the elongated lubricious member 48, and is depicted in cross-section similarity in FIG. 12. During erosion of the loop electrode 40, the lever arm 108 may be pivotally swung to the position indicated by phantom lines shown in FIG. 11 and which position is also shown in FIG. 13 wherein the camming relationship of the disc 100 and the portion in the outer wall 62 have caused the channel 50 to move with respect to the flange 52 to cause the loop electrode 40 to move transversely with respect to its direction of motion, thus providing a replenished edge to the web of paper 30 traveling therepast.

Indicia of location of the lubricious member 48 with respect to the channel 50 is accomplished by a plurality of color coded spots 116 on the lubricious member 48 which are successively exposed through an opening 118 in the outer wall 62 of the channel 50 as relative movement therebetween progresses.

Figure 14:
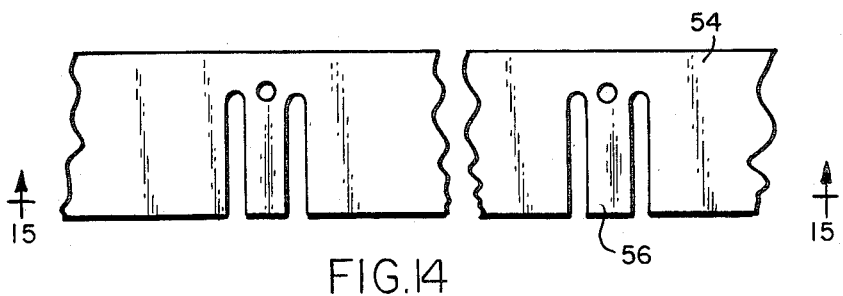
FIG. 14 is a side of a portion of the frame opposite the elongated lubricious member.
Figure 15:
FIG. 15 is a view taken along the line 15—15 of FIG. 14.

The bearing strip 54 is shown more fully in FIGS. 14 and 15, with the bowed fingers 56 formed thereacross which press the loop electrode 40 as it travels in touching engagement with the moving web of paper 30. The lubricious member 48, may preferably be constructed from a plastic material such as polypropylene or polyethylene having proper lubricity and rigidity characteristics.

Figure 16:
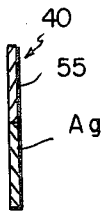
FIG. 16 is a section on line 16—16 of FIG. 2.

As shown in FIG. 16 the loop electrode may be in the form of a band having two lengthwise, parallel portions bonded together, for example a portion of relatively precious metal such as silver Ag, and a portion of relatively base metal such as steel or stainless steel alloy SS. The exposed, eroding portion is of silver, the precious metal, supported by the steel portion which though it lacks the black marking qualities of silver is a good support for the silver.

Thus, there has been shown a facsimile recording machine having a closed loop electrode which is adjustably supported in a linear configuration along that portion of the electrode which is in contact with the moving paper, the interrelationship of which causes the erosion thereof, and the subsequent need for close linear adjustable support thereof for optimum message reproduction.

We claim:

1. Apparatus for recording grahic signals on a web by electrical erosion of metal ions from an electrode, the apparatus comprising:
   an electrode with sides extending to a recording edge;
   means for moving the electrode on a linear path across the web;
   linear guiding means engaging both sides of the electrode to hold the electrode straight on said path, the recording edge of the electrode eroding toward the guiding means,
   and adjusting means including a manually adjustable pusher on the guiding means engaging the electrode, the pusher being manually adjustable from an initial position, in which it holds an unworn electrode at an initial extent from the guiding means, to an adjusted position outward of the guiding means in which it pushes a worn blade to the same extent thereby to compensate for erosion of the electrode.

2. Apparatus according to claim 1 wherein the electrode sides extend from a non-eroding edge, and the adjusting means includes an edge engaging the non-eroding edge of the electrode.

3. Apparatus according to claim 2 including a pivotable arm connected between the wall member and guiding means for actuating the adjusting means.

4. Apparatus according to claim 3 including detent means for holding the arm in adjusted position.

5. Apparatus according to claim 1 wherein the guide means includes an elongate, linear, lubricious plastic strip engaging one side of the electrode.

6. An apparatus for electrically recording graphic signals on a web as recited in claim 5 including:
   an elongated member disposed adjacent to and having portions biased towards said lubricious plastic strip to secure said moving band electrode in a linearly directed path therebetween.

7. An apparatus for electrically recording graphic signals on a web, as recited in claim 5, wherein said adjusting means is slidingly mounted on said elongated plastic strip to push said band electrode transversely as said band electrode erodes.

8. Apparatus according to claim 1 including a frame supporting the guiding means, the adjusting means being movable relative to the frame and guiding means.

9. An apparatus for electrically recording graphic signals on a web, as recited in claim 8, wherein the guiding means comprises a generally channel-shaped member extending along said straight path, said channel-shaped member being movable transversely toward said linear path, said electrode having an edge which is in sliding contact with one edge of a first side of said channel-shaped member, an elongated member being secured along one edge of said frame within said channel-shaped member, and a second side of said channel-shaped member is linked to said elongated member by at least one pivotable arm, and wherein pivoting of said arm about a pivot pin causes movement of said channel-shaped member with respect to said elongated member.

10. An apparatus for electrically recording graphic signals on a web as recited in claim 9, wherein said pivotable arm includes a cam member mating with a cam follower in said second side of said channel, wherein movement of said arm in a particular direction effects movement of said channel with respect to said frame portion and said elongated member.

11. An apparatus for electrically recording graphic signals on a web as recited in claim 9 wherein said pivotable arm includes second pivot pin is secured to said second side of said channel and has a distal end with an indexing point therein matable with plurality of indexing orifii within said second side of said channel, wherein movement of said pivotable arm in one direction causes corresponding movement of said channel in the opposite direction movement of said channel effecting transverse movement of said band electrode, to compensate for any erosion thereof.

12. Apparatus according to claim 1 wherein the electrode is a band composed of two lengthwise, parallel portions of different materials, one material being exposed at said recording edge.

13. Apparatus according to claim 12 wherein the exposed portion of the band is of a relatively precious metal.

14. Apparatus according to claim 13 wherein the exposed portion of the band is silver.

15. Apparatus according to claim 13 wherein the other portion of the band is of a base metal or alloy thereof.

16. Apparatus according to claim 1 wherein the adjusting means includes an elongate member with a shoulder supporting the electrode, and the guiding means includes means for translating the elongate member out of the guiding means thereby to expose more of the band electrode.

17. Apparatus according to claim 1 wherein the band electrode is a loop.

18. Apparatus according to claim 1 including:
   a base;
   a scanning electrode mounted on the base for scanning along the linear path of the band electrode;
   a cover hinged to the base, the band electrode being mounted on the cover to swing with the cover toward the scanning electrode; and
   stop means on the base adjacent the scanning electrode and opposed to the ends of the linear portion of the band electrode to engage the band electrode and position its linear portion in a predetermined position relative to the helical electrode for correct pressure of the band electrode against the helical electrode.

* * * * *